(12) United States Patent
Sinha

(10) Patent No.: US 12,000,798 B2
(45) Date of Patent: Jun. 4, 2024

(54) DETECTION OF STRUCTURAL VARIATIONS IN ARTICLES USING ACOUSTIC RESONANCE SPECTROSCOPY

(71) Applicant: AWE Technologies, LLC, Bay Shore, NY (US)

(72) Inventor: Dipen N. Sinha, Bay Shore, NY (US)

(73) Assignee: AWE Technologies, LLC, Bay Shore, NY (US)

( * ) Notice: Subject to any disclaimer, the term of this patent is extended or adjusted under 35 U.S.C. 154(b) by 407 days.

(21) Appl. No.: 17/238,512

(22) Filed: Apr. 23, 2021

(65) Prior Publication Data

US 2021/0333239 A1 Oct. 28, 2021

Related U.S. Application Data

(60) Provisional application No. 63/015,283, filed on Apr. 24, 2020.

(51) Int. Cl.
*G01N 29/12* (2006.01)
*G01N 29/46* (2006.01)

(52) U.S. Cl.
CPC ............. *G01N 29/12* (2013.01); *G01N 29/46* (2013.01); *G01N 2291/014* (2013.01); *G01N 2291/044* (2013.01); *G01N 2291/045* (2013.01)

(58) Field of Classification Search
CPC .. G01N 29/12; G01N 29/46; G01N 2291/014; G01N 2291/044; G01N 2291/045; G01N 29/2418; G01N 2291/102; G01N 29/348; G01N 29/42; G01N 29/4436; G01N 29/4454

See application file for complete search history.

(56) References Cited

U.S. PATENT DOCUMENTS

| | | | | |
|---|---|---|---|---|
| 4,823,600 A * | 4/1989 | Biegel | .................. | G01M 3/243 73/592 |
| 2007/0068225 A1* | 3/2007 | Brown | .................... | G01M 3/24 73/40.5 A |
| 2009/0078049 A1* | 3/2009 | Sinha | .................... | G01N 29/28 73/623 |

OTHER PUBLICATIONS

Sinha, Dipen N., Acoustic Resonance Spectroscopy (ARS)—Tracking Those "Good Vibrations" for Nondestructive Evaluation, IEEE Potentials, 0278-6648/92, pp. 10-13, Apr. 1992.

* cited by examiner

*Primary Examiner* — Tarun Sinha
(74) *Attorney, Agent, or Firm* — Samuel M. Freund; Cochran Freund & Young LLC

(57) ABSTRACT

An apparatus and method utilizing acoustic resonance spectroscopy applicable to any mechanical device or structure having internal or external components that need to be positioned away from a set point and then returned to the original position, such as a valve which is opened to pass fluids and subsequently closed, for noninvasively providing a measure of the deviation from the original position, and for classifying or grouping together objects that appear to be identical from the outside, but which may have slight external or internal differences, such as sealed containers filled with different fluids or materials, are described.

31 Claims, 7 Drawing Sheets

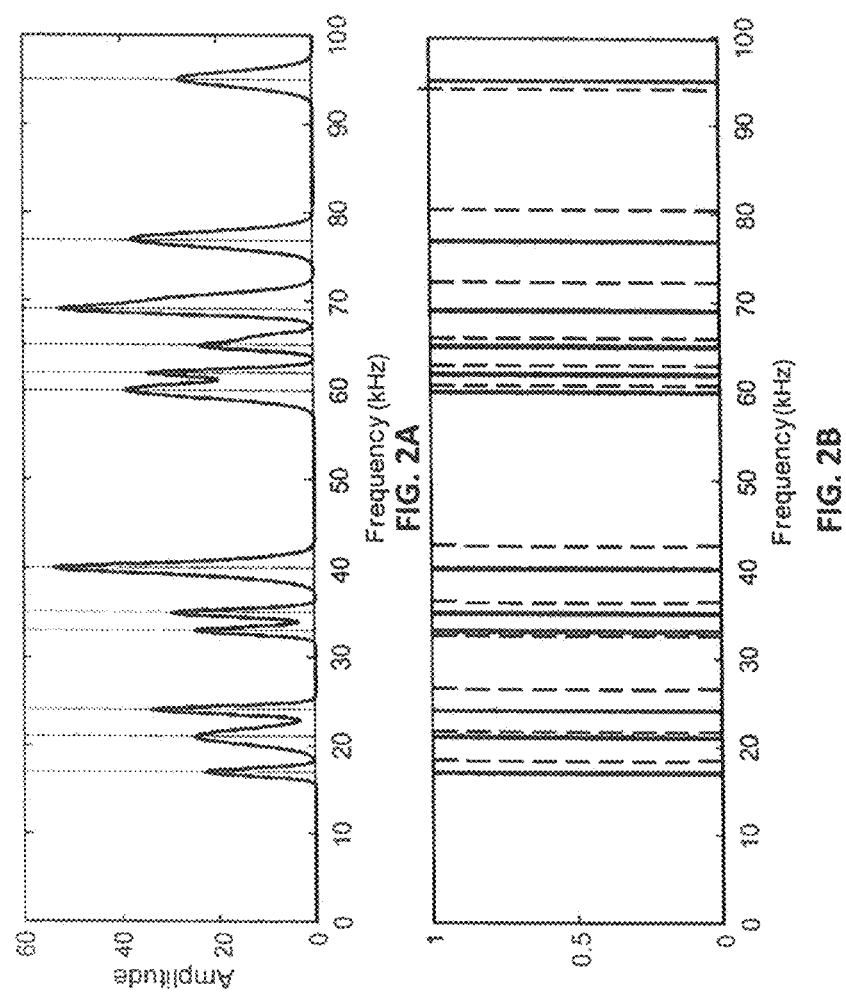

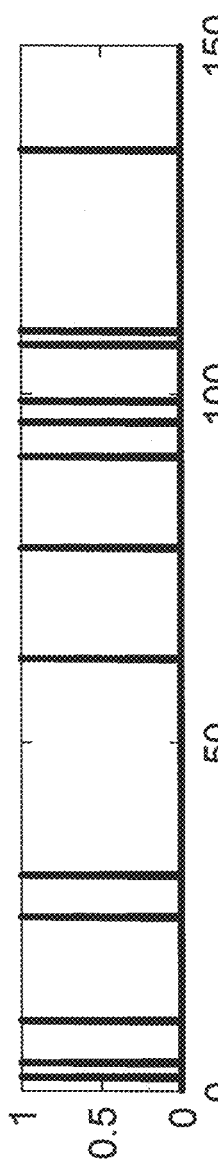
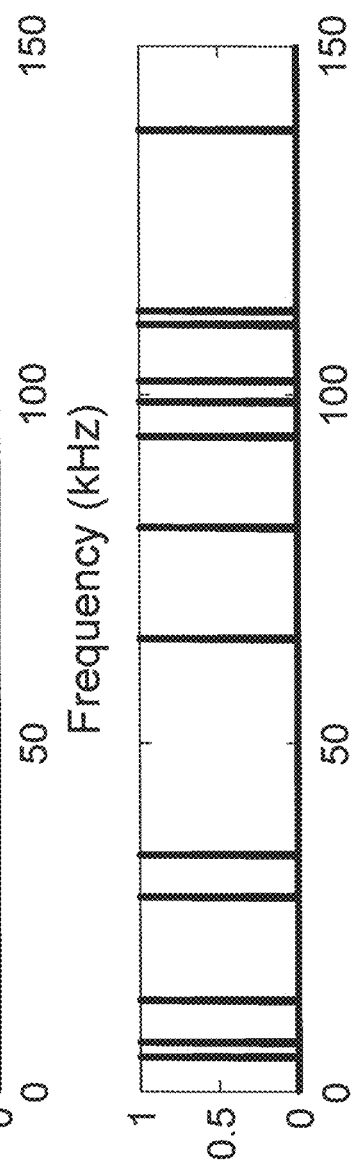
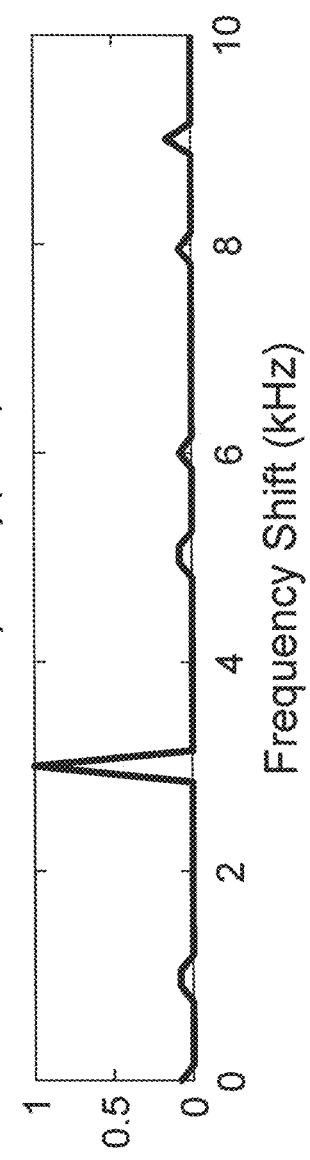
FIG. 5A
FIG. 5B
FIG. 5C

DETECTION OF STRUCTURAL VARIATIONS IN ARTICLES USING ACOUSTIC RESONANCE SPECTROSCOPY

CROSS-REFERENCE TO RELATED APPLICATIONS

The present application claims the benefit of U.S. Provisional Patent Application No. 63/015,283 for "Leakage Detection in Valves By Ultrasonic Resonance" which was filed on 24 Apr. 2020, the entire content of which is hereby specifically incorporated by reference herein for all that it discloses and teaches.

BACKGROUND

Mechanical devices or structures having internal or external components that need to be positioned away from a set point and later returned to theft original location are common, as are situations where deviations or variations from known articles due to manufacturing or counterfeiting. As examples of the former situation, valves that control volatile gases, such as natural gas or other combustible media, or corrosive or reactive fluids, can have a huge impact on safety when leaks occur.

Although the focus of valve leakage is typically to reduce loss of expensive products or to mitigate environmental contamination, when leaks in industrial processes are considered, often the product is neither costly nor by itself dangerous, water being an example. In practice, a small amount of valve leakage is tolerated in most control applications, while for shut-off valves, the smallest amount of unwanted process medium leakage may cause severe damage. Flow meters are often used for monitoring of seat leakage, but are not very reliable and cannot detect small leakage due to improper seating of valves.

In fact, the largest industrial disaster in history is suspected to have occurred because of a faulty water valve. Thousands of people were killed in the Bhopal gas tragedy, which occurred in Bhopal India in 1984 when lack of routine maintenance resulted in a flow of one ton of water into a tank containing 40 tons of toxic methyl isocyanate. The highly exothermic reaction pressurized the tank through formation of carbon dioxide, and released unreacted methyl isocyanate into the plant and throughout the surrounding town. Another well-known disaster is the BP Deepwater Horizon oil spill in 2010, which is also thought to have been the result of the failure of two valves tasked with halting the flow of oil and gas.

In addition to safety concerns, valve leakage can lead to wasted energy and other operating losses. For example, such leaks can cause a drop in system pressure that results in air tools functioning less efficiently, thereby negatively impacting production. If fluids are used to transfer energy in an electrical power plant, energy can be dissipated into the atmosphere through leakage, which can waste significant energy annually.

SUMMARY

In accordance with the purposes of the present invention, as embodied and broadly described herein, an embodiment of the apparatus for determining whether fluid is leaking through a valve seat when the valve is in a closed condition, hereof, includes: a valve comprising a valve seat, a disk or plug for forming a fluid seal with the seat, a stem for driving said disk or plug against the seat, and a valve body having an outside surface; an acoustic transmitting transducer disposed in vibrational contact with the outside surface of the valve for generating vibrations in the valve body when excited by a chosen voltage signal; an acoustic receiver disposed in vibrational contact with the outside surface of the valve for receiving vibrations induced in the valve body, and converting the received vibrations into electrical voltages; a frequency sweep generator in electrical communication with the acoustic transmitting transducer, for generating chosen excitation voltage signals having frequencies within a selected frequency range thereon; a narrow-band, band-pass tracking filter having a center frequency which tracks the frequencies within the selected frequency range generated by the frequency sweep generator, and having a chosen frequency bandwidth, for receiving electrical voltages from the acoustic receiver and for filtering the electrical voltages; and a microcontroller for controlling the frequency sweep generator and the band-pass tracking filter, for storing the filtered electrical voltages from said band-pass tracking filter, for generating at least two acoustic resonance spectra of said valve in its closed condition, and for comparing the at least two generated acoustic resonance spectra to determine whether there is a difference therebetween.

In another aspect of the present invention and in accordance with its purposes, as embodied and broadly described herein, an embodiment of the method for determining whether fluid is leaking through a valve seat of a valve when the valve is in a closed condition, hereof, includes: generating vibrations having chosen frequencies in a selected frequency range in said valve comprising a valve seat, a disk or plug for forming a fluid seal with the seat, a stem for driving the disk or plug against the seat, and a valve body having an outside surface from an acoustic transmitting transducer disposed in vibrational contact with the outside surface of the valve and driven by a frequency sweep generator; receiving resonance vibrations induced in the valve body using an acoustic receiver disposed in vibrational contact with the outside surface of the valve, and converting the received vibrations into electrical voltages; receiving the electrical voltages and filtering the electrical voltages using a narrow-band, band-pass tracking filter having a center frequency which tracks selected excitation frequencies in the selected frequency range; storing the filtered electrical voltages, whereby an acoustic resonance spectrum of the valve is generated and stored; comparing the generated acoustic resonance spectrum of the valve with at least one other acoustic resonance spectrum obtained for the valve in the closed condition thereof; and determining whether there is a difference between the generated acoustic resonance spectrum and the at least one other acoustic resonance spectrum.

In yet another aspect of the present invention and in accordance with its purposes, as embodied and broadly described herein, an embodiment of the method for determining whether a vessel similar or identical in appearance to other vessels is similar or identical thereto, and contains similar fluids thereto, hereof, includes: generating vibrations having chosen frequencies in a selected frequency range in the vessel from an acoustic transmitting transducer disposed in vibrational communication with the outside surface of the vessel, and driven by a frequency sweep generator; receiving resonance vibrations induced in the vessel using an acoustic receiver disposed in vibrational communication with the outside surface of the vessel, and converting the received vibrations into electrical voltages; receiving the electrical voltages and filtering the electrical voltages using a narrow-band, band-pass tracking filter having a center frequency which tracks selected excitation frequencies in the selected frequency range; storing the filtered electrical voltages, whereby an acoustic resonance spectrum of the vessel is generated; comparing the generated acoustic resonance spectrum of the vessel with at least one acoustic resonance spectrum obtained for another of the vessels; and determining whether there is a difference between the generated acoustic resonance spectrum and the at least one other acoustic resonance spectrum.

In still another aspect of the present invention and in accordance with its purposes, as embodied and broadly described herein, an embodiment of the method for determining the tightness of sealing flanges, including a cover flange and a flange attached to a pipe secured by bolts and nuts or a clamp, for accessing fluids in a vessel, hereof, includes: generating vibrations having chosen frequencies in a selected frequency range in the sealing flanges, the nuts and bolts or the clamp, whichever is used, the pipe, and the vessel, using an acoustic transmitting transducer disposed in vibrational communication with an outside surface of the pipe or the vessel and driven by an acoustic frequency sweep generator; receiving resonance vibrations induced in the sealing flanges, the nuts and bolts or the clamp, the pipe, and the vessel, combined, using an acoustic receiver disposed in vibrational contact with the outside surface of the pipe or the vessel, and converting the received vibrations into electrical voltages; receiving the electrical voltages and filtering the electrical voltages using a narrow-band, band-pass tracking filter having a center frequency which tracks selected excitation frequencies in the selected frequency range; storing the filtered electrical voltages, whereby an acoustic resonance spectrum of the combination of the sealing flanges, the nuts and bolts or the clamp, the pipe, and the vessel, is generated; comparing the generated acoustic resonance spectrum that includes the frequency range of the combination of the sealing flanges, the nuts and bolts or the clamp, the pipe, and the vessel with at least one other acoustic resonance spectrum obtained for the combination of the sealing flanges, the nuts and bolts or the clamp, the pipe, and the vessel; and determining whether there is a difference between the generated acoustic resonance spectrum and the at least one other acoustic resonance spectrum.

Benefits and advantages of the present invention include, but are not limited to, providing an apparatus and method utilizing acoustic resonance spectroscopy applicable to any mechanical device or structure having internal or external components that need to be positioned away from a set point and then returned to the original position, such as a valve which is opened to pass fluids and subsequently closed, for noninvasively providing a measure of the deviation from the original position, and for classifying or grouping together objects that appear to be identical from the outside, but which may have slight external or internal differences, such as sealed containers filled with different fluids or materials.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings:

FIG. 1A is a schematic representation of a cross-section of closed, but incompletely seated shut-off valve, and an embodiment of an apparatus used to demonstrate an embodiment of the method of the present inventions, illustrating a broad-band ultrasonic transmitting transducer for generating vibrations in the valve when excited by a voltage signal, and an identical broad-band ultrasonic receiving transducer for receiving vibrations induced in the valve and converting such signals into voltages, while FIG. 1B is a schematic representation of a cross-section of the properly closed and sealed shut-off valve illustrated in FIG. 1A.

FIG. 2A is a graphical illustration of a sample resonance spectrum, with vertical solid lines marking centers of the resonance features, while FIG. 2B is a graphical illustration of a randomly shifting resonance spectrum (vertical dashed lines) from the resonance positions of FIG. 2A, as would be the situation for the reference resonance spectrum for a properly seated valve and the measured resonance spectrum for a poorly-seated valve, respectively.

FIG. 3A is a graph showing the repeatability of the resonance spectra and that the resonance peak positions remain the same while the amplitudes may vary where ten (10) data sets taken by removing and placing the transducers on a gate valve are superimposed to derive the reference template, while

FIG. 5A shows a resonance frequency spectrum of a cylindrical steel vessel at ambient pressure, converted to a barcode form, where the peak locations are indicated with vertical lines (reference spectrum), FIG. 5B is the resonance spectrum obtained for the vessel in FIG. 5A when the pressure inside the vessel is increased, illustrating that the frequency spectrum is shifted toward higher frequency, and FIG. 5C is a graph illustrating the pattern matching of the spectra from FIGS. 5A and 5B as obtained by mathematically shifting the reference spectrum in frequency to match the spectrum at higher pressure, where the peak corresponds to the observed frequency shift due to the increased pressure.

DETAILED DESCRIPTION

Figures 1A, 1B:
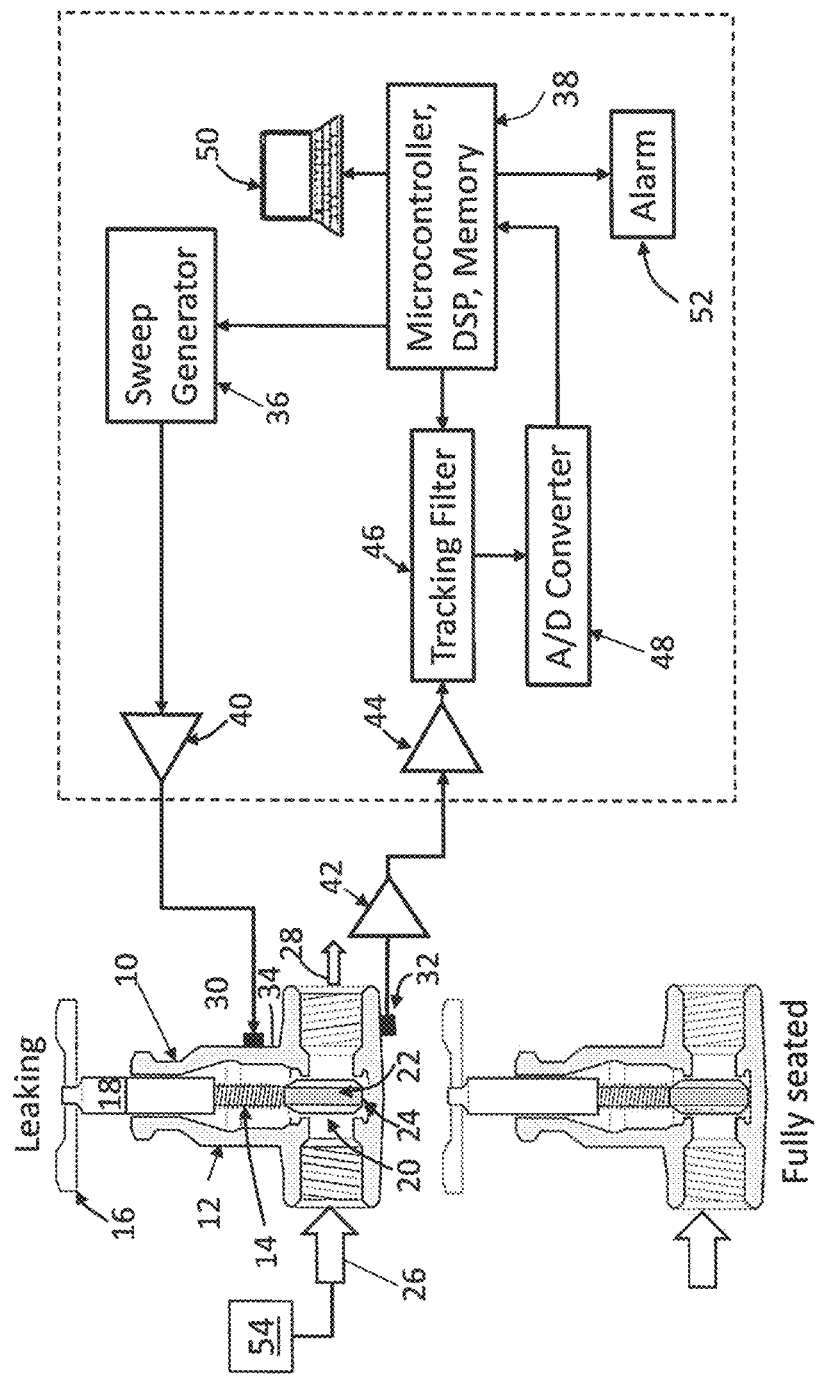

Briefly, an embodiment of the apparatus of the present invention, a broad-band transmitting transducer and a broad-band receiving transducer are placed in acoustic contact with the outside surface of the article or object for which structural variations from a chosen state or from a selected reference article are to be investigated. The transducers may be placed close to one another, but not touching, or placed farther apart. The positioning is not critical, and for permanent attachment, an epoxy or other glue may be used. A frequency sweep generator, controlled by a micro-controller, sends a voltage signal that varies in frequency through a power amplifier to the transmitting transducer. The power amplifier also provides for electrical impedance matching for efficient energy transfer to the transducer. The direction of frequency sweep is not critical as both produce the same spectrum. The transducer vibrates at the frequencies generated by the sweep generator, the vibration being coupled to the body of the article. When this excitation vibration signal matches any of the natural vibration modes of the article, a large amplitude response is detected by the receiving transducer. The output of the receiving transducer may be amplified and passed through a narrow band, band-pass tracking filter having a selectable frequency bandwidth. Following filtering, the signal is digitized by an A/D converter that is controlled by a microcontroller. The microcontroller extracts the magnitude of the received signal and records this magnitude at each of the frequencies applied to the source transducer. At the end of the frequency sweep, an acoustic resonance spectrum for the article is generated.

Embodiments of the present invention are applicable to any mechanical device or structure having internal or external components that need to be positioned away from a set point and then returned to the original position, such as a valve which is opened to pass fluids and subsequently closed, for providing a measure of the deviation from the original position. It can also be used for determining the tightness of flanges. If a flange or other lid is replaced where some of the bolts are not tightened to their original torque, the resonance spectrum will change and can be detected. A similar situation exists when a clamp, such as a tri-clover clamp, is used to seal flanges common in breweries, and in the food and pharmaceutical industries. Another example includes medical screws attached to bones. Occasionally these screws loosen, but x-rays cannot show this. When the screws are tightly attached to the bone, there is damping of the resonances as compared to when the screws are loose, and the resonance pattern may change. One can use electromagnetic acoustic transducers (EMAT) that can excite metal screws. The same transducer can be used to monitor the resonance through variation in its electrical impedance.

Another embodiment of this invention can be used to classify or group together objects that appear to be identical from the outside, but which may have internal differences, such as sealed containers filled with different fluids or materials. Once a reference template spectrum is obtained for each container type, the kind of material within a container under investigation can be identified. Thus, noninvasive identification of fluids inside sealed containers can be achieved. Additionally, embodiments of the present invention can be used to determine the tolerances and uniformity of manufactured or machined items, such as deviations of counterfeit vaccine vials from those produced by approved manufacturers.

As stated above, embodiments of the present invention include an apparatus and method for noninvasive leakage detection in valves. When complete closing of a valve is impaired for some reason, leakage across the valve seat does not become visible on the outside of the valve. However, there can be a serious problem with the valve in this condition since an unacceptable amount of the process medium continues to flow through the valve. Among other problems, this flow can cause internal damage, which will reduce the service life of the valve.

A complex object is not a single vibrating mass, such as a sphere or cube. Rather, it contains multiple volumes (regions) having different lengths, widths, etc., each of which contribute their individual resonances. The effect of any stress or external condition will be different for each of these regions. Thus, a valve may be considered to be a sum of all these separate regions of metal.

Any solid object possesses a large number of natural modes of vibration where the object vibrates with a large amplitude if excited at that vibration frequency. These modes of vibration, when viewed over a range of frequencies, constitute a resonance spectrum. This spectrum depends on the elastic properties and geometry of the object material. In case the object is composed of multiple components, each component will contribute to this spectrum. The smaller the component, the higher the resonance frequencies become. Therefore, an object such as a valve, will produce a complex acoustic resonance spectrum. A variation in any component is reflected in the resonance spectrum. Not all resonance vibration modes are affected in the same way and some modes will show larger variation due to changes in internal configuration, and some will show very little. Thus, the resonance spectrum can serve as the basis for leak detection when the valve is not properly seated.

All valves through which fluids are passing will emit a range of vibrational frequencies (noise), which can often be detected using an acoustic transducer. The physical source of leak noise is the varying pressure field associated with turbulence in the fluid, resulting from flow instability where inertial effects dominate viscous drag. For flow in a cylindrical path, Reynolds numbers between 1000 and 10,000 generate turbulence in fluids, giving a lower limit for leak detection under ideal conditions. There are a number of other mechanisms that contribute to the vibration signals associated with leakage across valves, including turbulent mixing, shock-associated noise, cavitation in liquids, and mechanical sources within the valves. These latter sources of noise may be caused by seat peening damage, deposit build up on the seat, or scoring of the valve plug.

There is a commercially-available device that allows for quantification of internal leaks in valves having a single fluid at high pressure based on acoustic detection of flow-induced vibration or sound. The measurement is passive and is achieved with a sensor attached to the valve. In order to identify and quantify a leaking valve, the valve must be in its closed position, and there must be a differential pressure of at least one bar across the valve. The leak rate is then determined after the specific parameters are input into a predictive equation. The measurement takes about two minutes per valve, but can be disturbed by nearby pressure differentials in other fluids.

In practice, there are a number of considerations that affect the ability to detect leaks, including:

The leakage path for small leaks is usually complex, resulting in much higher turbulence, hence more noise from real leaks than otherwise predicted;

The product loss may not come from one single leak but from multiple leaks distributed around a valve seat. If these are below the critical point for turbulent flow, then no noise is emitted;

If all the leaks are noisy, then the signals will add up to a different result than a single leakage path;

The noise level at the source is not what the sensor actually detects; that is, the signal travels through the valve body to where the sensor is mounted on the outside; and Background noise from nearby turbulent flow or from normal plant noise and vibration can make the measurement position important.

Generally, there are many ambient vibrations from the machinery and other instruments where control valves are used in industry. Any detection system must therefore be immune to such ambient vibrations. Passive measurements and resonance analyses have been used to detect defects in machinery attached to control valves where the detected vibrations are analyzed using a spectrum. Typically, rotary components produce tell-tale resonance characteristics and the present technique allows its detection; for example, a loose component rattles when it undergoes rotation or strong vibrations.

To generate a reference spectrum for a valve, multiple spectra are obtained for a properly seated valve by opening and then closing the valve each time before a spectrum is recorded. A mean value for each frequency is recorded and the reference spectrum is replaced by the mean position for each of the peaks. The exact amplitude of each resonance peak contributing to the reference spectrum may be slightly different depending on the location of the receiving transducer, but the locations of the resonances remain the same, except for negligible variations due to manufacturing tolerances. A deviation in the frequency spectrum of the valve from this reference spectrum beyond a chosen amount is then considered to be due to the valve not being fully closed. As will be presented below, a peak-position correlation algorithm was developed for correlating resonance frequencies to determine the closeness of a measured spectrum to the reference spectrum; that is, the total number of peaks that are common within a predefined frequency spread or frequency window for both reference and measured resonance spectra. The commonly employed methodology for cross-correlation of the entire spectrum with the reference spectrum is sensitive to peak amplitudes, which, as stated, can vary with the location of the transducers on a valve.

Although the following description primarily discusses gate valves, other valves, such as ball valves will work with this device as well and it is not limited to gate valves. In a gate valve a rectangular gate is inserted into the path of a flowing fluid perpendicularly thereto, generally by a threaded stem which is connected to an actuator (a hand wheel or motor). The gate then seals against a seat by means of a gland. Gate valves are used primarily for on/off (fully closed or fully open), non-throttling service and are commonly used in refineries and petrochemical plants where pressure remains relatively low, but temperature may be very high. Gate valves are used less frequently in upstream oil and gas production facilities due to high operating pressures, long opening/closing times, and severe environmental conditions when operating in marine atmospheres.

Abrasive process medium, cavitation or flashing can cause progressive erosion of a valve. This erosion will result in leakage through the seat and disc or plug over the course of a valve's service life. The process fluid will continue to leak through a closed valve.

As stated, in practice, a small amount of seat leakage is tolerated in most control applications. By contrast, for shut-off valves, the smallest amount of unwanted process medium leakage can cause severe damage. Uncontrolled flow of toxic, highly reactive or highly flammable media would be an example of unwanted flow. In such cases, it is important that signs of wear on the plug are detected at an early stage, and plant operators must be alerted when unacceptable amounts of the medium flows through a closed valve.

In what follows, the word "ultrasonic" is meant to include both "sonic" and "ultrasonic" regions of the acoustic spectrum. Further, valve leakage refers to flow through a valve which is set in the 'off' condition or state; that is, through the valve seat, as opposed to through the valve stem. As stated above, the importance of such valve leakage depends on what the valve is controlling. Fluids, may be gases or liquids, or combinations thereof.

Reference will now be made in detail to the present embodiments of the invention, examples of which are illustrated in the accompanying drawings. In the Figures, similar structure will be identified using identical reference characters. It will be understood that the FIGURES are presented for the purpose of describing particular embodiments of the invention and are not intended to limit the invention thereto. Turning now to FIG. 1A, illustrated is a schematic representation of a cross-section of closed, but incompletely seated shut-off valve of the gate valve variety, 10, illustrating body, 12, stem, 14, driven by handwheel, 16, through bonnet, 18, gate, 20, bearing flexible element, 22, for sealing against seat, 24. In metering or other types of shut-off valves, a disk or plug may be used to close off seat 24. Shown also is fluid, 26, leaking, 28, through valve body 12. By contrast, FIG. 1B is a schematic representation of a cross-section of the properly closed and sealed shut-off valve illustrated in FIG. 1A. Small leaks are difficult to detect noninvasively.

Broad-band acoustic transmitting transducer, 30, which generates vibrations in valve 10 when excited by a voltage signal, and identical broad-band acoustic receiving transducer, 32, for receiving vibrations induced in valve 10 and converting such signals into voltages, are attached (in acoustic or vibrational communication) at arbitrary locations on outside surface, 34, of valve body 12 to perform the measurements described herein, since resonance vibration will be distributed over the entire valve. The transducers may be disposed side-by-side, as long as they do not contact one another. For permanent attachment, a glue, such as an epoxy may be used. For quick measurements, simple magnetic coupling is sufficient if valve 10 comprises a magnetic material. Transmitting transducer 30 and receiving transducer 32 are interchangeable if piezoelectric transducers are used. It is not required that the transducers be identical, and different transducers (e.g., magnetostrictive, capacitive, electromagnetic acoustic—EMAT transducers, as examples) can also be used. Commercial, off-the-shelf 1 MHz center frequency, broad-band piezoelectric transducers from Olympus NDT, were employed for both transmitter (source) and receiver, one for each. Typical frequency scans were between about 2 kHz and about 150 kHz.

Frequency sweep generator, 36, controlled by microcontroller, 38 (e.g., Arduino, Raspberry Pi, Single Board Computers, etc.) applies a linearly varying voltage signal from a low frequency to a high frequency through power amplifier, 40, to transmitting transducer 30. Amplifier 40 also provides electrical impedance matching for efficient energy transfer to transducer 30. The applied voltage signal can be nonlinear as well, and the direction of frequency sweep can be reversed, if desired, since both sweep directions produce the same spectrum. The frequency may be stepped through the chosen frequency range in small frequency steps, the step size being determined by the number of frequency values one desires in the spectrum, and transducer 30 vibrates at each of the frequency steps. For example, each frequency may be applied for a short time (~1 ms) and then moved to the next value in the sweep, and a frequency scan between 1 and 10 kHz would have 1000 frequency steps. Greater than 2000 steps have been found to provide adequate frequency resolution over any chosen frequency sweep span, but smaller numbers can also be utilized. The resulting vibration produced by transducer 30 is coupled to the body of the valve (or object). When this excitation vibration signal matches any of the natural vibration modes of the object (e.g., valve), a large amplitude response is detected by receiving transducer 32.

The signal received by transducer 32 is first buffered at the receiving transducer output using buffer amplifier, 42, if needed, whereby the small signal voltage from receiving transducer 32 can be directed to signal amplifier, 44, without significant distortion or loading. Amplifier 42 may be an integral part of the receiving transducer 32. After amplification, the output of signal amplifier 44 is passed through narrow-band, band-pass tracking filter, 46, having a center frequency at the excitation frequency generated by frequency sweep generator 36, and having a selectable frequency bandwidth. Filter 46 thus follows each excitation frequency, thereby reducing the electrical noise pick up from ambient vibrations, Tracking filter 46 is synchronized with the sweep generator by Digital Signal Processor (DSP)/microcontroller 38, and can be implemented in several different ways, such as heterodyne or homodyne techniques, or a vector network analyzer, as examples. Following filtering, the signal is digitized by A/D (analog-to-digital) converter, 48, that is also controlled by microcontroller 38. A 12-bit A/D converter operating at 1 MHz is sufficient for this purpose, but the described embodiment of the apparatus is not limited to these values. The digitized data is stored in the memory of microcontroller 38 before further processing.

Microcontroller 38 extracts the magnitude of the received signal and records this magnitude at each of the frequencies applied to transmitting transducer 30. Microcontroller 38 can also determine the phase shift at each frequency as well through the DSP. The phase information may be used to determine the exact location of the resonance peaks, and is valuable in situations when the amplitude of the resonance peak is small. By phase, it is meant the phase difference between the transmitted signal and the received signal, and can be set to a zero value at resonance; a simple zero-crossing algorithm can then locate the peak resonance frequency. At the end of a frequency sweep, typically <10 s, a complete resonance spectrum is generated comprising an amplitude spectrum and a phase spectrum. The amplitude spectrum is sufficient in most situations, but for measurement robustness it useful to make use of both amplitude and phase information.

The duration of the measurement can be shortened depending on the amount of ambient noise. Higher ambient noise requires smaller band-widths for the tracking filter and slower sweep times. A slower sweep time is also recommended for sharp resonance peaks. Accordingly, a sweep measurement can be completed in 1 s if ambient noise is not too high. As stated, the tracking filter bandwidth provides ambient noise immunity by limiting the noise level to a small value and by averaging the recorded noise, thereby providing signal-to-noise ratios that can be as high as 92 dB.

Inexpensive, commercially-available microcontrollers have sufficient memory to store reference template waveforms for comparison and for carrying out the required analyses. It is also possible to use a computer capable of being interfaced with the above-described electronics. Use of a DSP can speed up the analysis. After analysis of a valve, results may be displayed on screen, 50, and/or used to trigger alarm, 52. A signal output can be used to provide feedback for operating the valve using a motorized valve operating device (not shown in FIG. 1A or 1B) in place of handwheel 16. For example, if the apparatus illustrated in FIGS. 1A and 1B detects improper seating, a control signal can be generated for re-adjusting the valve until proper seating is observed, if possible.

As will be discussed in greater detail below, the pressure in fluid 26 may be measured by pressure sensor, 54.

As mentioned, embodiments of the present invention can be used for determining the tightness of abutting flanges. If a flange or other lid is replaced where some of the nuts and bolts are not tightened to their original torque, or a clamp, such as a tri-clover clamp, used to seal flanges common in breweries, and in the food and pharmaceutical industries, is not properly closed, the acoustic resonance spectrum of the system will change and can be detected. In the situation where tri-clover clamps are employed on sealing flanges closing access ports to fermentation vessels, the acoustic transducers would be placed in acoustic communication with the outside surface of either the pipe attached to the flange against which a cover flange is placed, or on the outside surface of the fermentation vessel to which the access pipe is attached, in a similar manner to that described above for valves. Here the vibrating system includes the combination of abutting flanges, the access pipe, the vessel, and the clamp or nuts and bolts, whichever is employed. It should be mentioned that the acoustic transducers can also be placed on the cover flange or the flange attached to the pipe, but this would likely interfere with the bolts or clamps utilized.

In the situation where it is desired to classify or group together objects that appear to be similar or identical from the outside, but which may have small external differences or internal differences, such as sealed containers filled with different fluids or materials, and are therefore not similar or identical to others in a group of containers. The acoustic transducers would again be placed in acoustic communication with the outside surface of the vessels or containers. By similar or identical in appearance is meant that the containers are within manufacturing specifications, or are slightly outside of manufacturing specifications or are counterfeit, but appear visually to be similar or identical to containers within manufacturing specifications. It should be mentioned that the transducers may be placed virtually anywhere on the outside surface of the objects under investigation. Once a reference template spectrum is obtained for each container type, the material within a container under investigation can be identified. Thus, noninvasive identification of fluids inside sealed containers can be achieved. Additionally, tolerances and uniformity of manufactured or machined items, such as deviations of counterfeit vaccine vials from those produced by approved manufacturers, or vials or syringes filled with counterfeit materials, can be determined. Liquid containers may include vials and syringes.

It should be mentioned that the liquid loading effect shows up as broadening of the resonance peaks as a result of higher viscosity and frequency shift due to density change. However, the shift is not uniform across the spectrum as in the case of pressure variations to be discussed more fully below, and varies with the various modes. The barcode format discussed above in such cases may be modified to include the width information as full-width-at-half-maximum, thereby changing the thickness of the lines.

In situations where physical contact with a valve is difficult or impossible, non-contact measurements may be made. As an example, a laser Doppler vibrometer can be used to monitor the vibration of the object under investigation from a distance that can be >10 m, if needed, while the excitation can be achieved using sound projection where a collimated beam of sound is projected onto the valve. The remainder of the measurement system would remain the same as shown in FIG. 1A.

A resonance spectrum can also be obtained using impulse excitation, and digitizing the response over a certain time period. However, this does not provide significant immunity to ambient vibration, since the electronics detect the noise over the entre frequency sweep range. To obtain proper resonance spectra, sufficient spectra must be taken and time allowed for the lower frequency resonances to reach equilibrium, and to be properly recorded. Although a vibration spectrum can be recorded with impulse excitation, this technique in impracticable in industrial environments where ambient vibrations can be high.

In signal processing, commonly used regular cross-correlation is a measure of similarity of two time series (any data set or plot) as a function of the displacement of one series relative to the other; that is, one can determine how well an unknown curve matches a known curve. Cross-correlation of two digitized waveforms involves cross-multiplication of the individual waveform elements and summation of the cross-multiplication products over the common time interval of the waveforms. The cross-correlation function involves progressively sliding one waveform past the other and, for each shift, or lag, summing the cross-multiplication products to derive the cross-correlation as function of lag value. Given two digital waveforms of finite length, $x_j$ and $y_j$ (i=1,2, . . . . , n), the cross-correlation function is given by $$R_{xy}(\tau) = \sum_{i=1}^{n-r} x_{i+r} y_i (-m < \tau < +m)$$

where, $\tau$ is the lag and m is known as the maximum lag value of the function. The function relies on the shape (amplitude) of the wave; that is, the peak locations are less important than the amplitudes for finding the best match. If the curves are alike, then the correlation function will be 1, while if they are entirely dissimilar, then the correlation coefficient will be 0.

Since amplitudes corresponding to resonance features of valves, as an example, can vary due to environmental factors, prolonged use, and the locations of the transducers on the valves, regular cross-correlation will provide an answer that will vary based on how resonance peak amplitudes change, thereby giving unreliable numbers. However, a peak position-based signature correlation, as will be described in detail below, does not change if the amplitude of any resonance changes, and provides a very robust answer.

FIG. 2A is a graphical illustration of a sample resonance spectrum, with vertical solid lines marking centers of the resonance features, while FIG. 2B is a graphical illustration of a randomly shifting resonance spectrum (vertical dashed lines) from the resonance positions of FIG. 2A, as would be the situation for the reference resonance spectrum for a properly seated valve and the measured resonance spectrum for a poorly-seated valve, respectively.

Figure 3A:
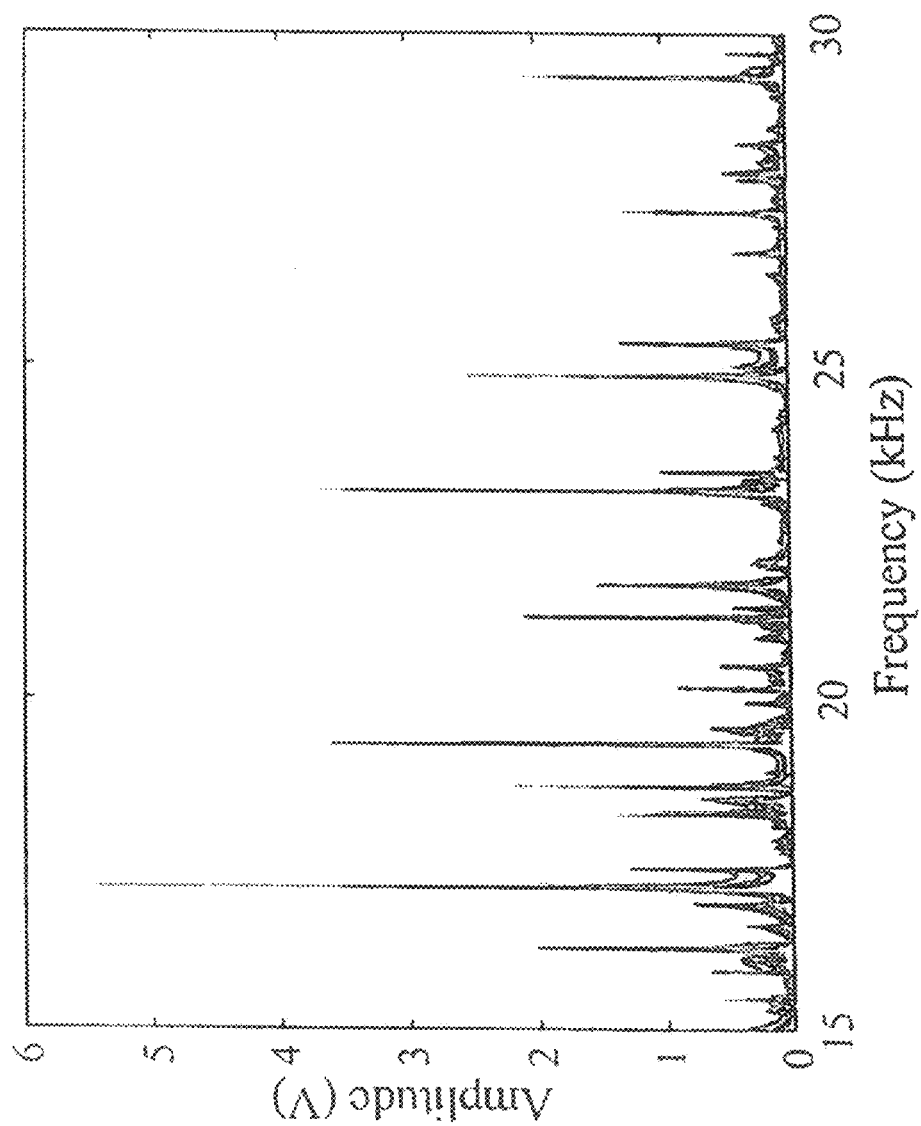
Figure 3B:
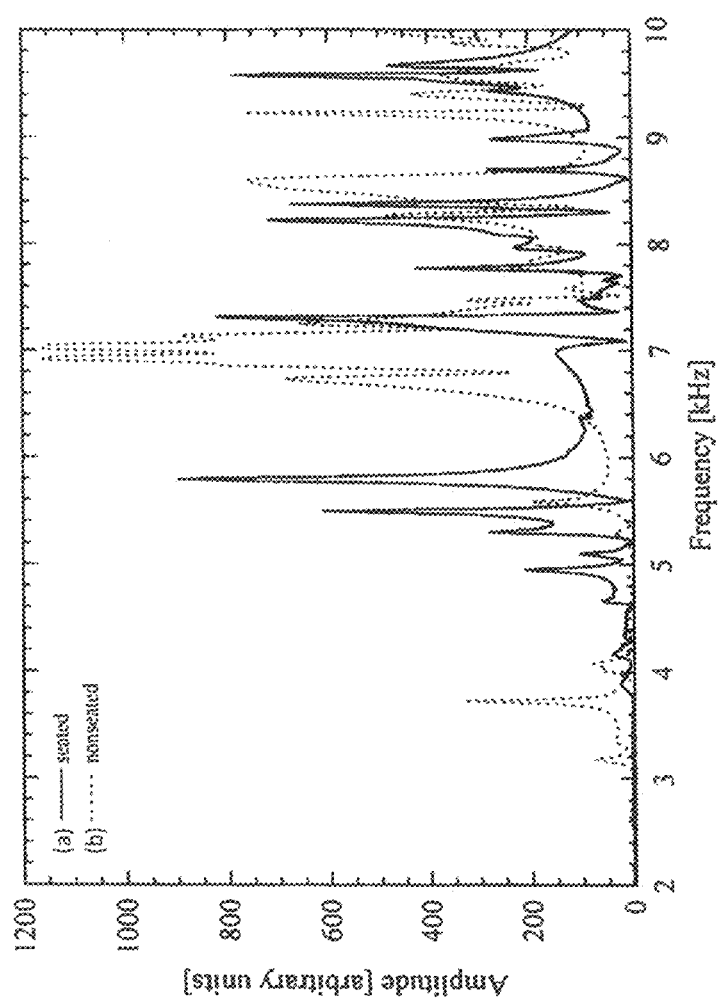
FIG. 3B shows an example resonance spectrum (a small section of larger frequency range to highlight the differences) of a 2-inch gate valve that is fully closed ((a); solid line) and when the valve is not fully seated ((b); dashed one) causing a small leak.

FIG. 3A is a graph showing the repeatability of the resonance spectra and that the resonance peak positions remain the same while the amplitudes may vary where ten (10) data sets taken by removing and placing the transducers on a gate valve are superimposed to derive the reference template, while FIG. 3B shows an example resonance spectrum (a small section of larger frequency range to highlight the differences) for a 2-inch gate valve that is fully closed or seated ((a); solid line), and when the valve is not fully seated ((b); dotted line) causing a small leak. The variation in the spectrum is substantial and is readily observed. The spectrum is repeatable in terms of the locations of the resonance peaks from measurement to measurement when the valve is fully seated and closed, as may be observed from FIG. 3A. A deviation in the spectrum from this reference beyond a chosen amount is considered as a valve that is not fully closed, and therefore a leaking valve. Such leaks are difficult to detect using pressure gauges and other means.

Measurements were made with high pressure air flowing through the valve, and will yield the same results for any gas. For liquids, there can be slight dampening (broadening) of a few spectral lines and marginal shift in frequency.

As mentioned, the amplitude of each resonance peak may differ slightly depending on the location of the receiver transducer, but the resonance locations remain the same since the location of the receiver transducer may be at or near a node for a particular resonance mode such that the detected amplitude is small, or the peak completely disappears. Therefore, an algorithm has been developed by the present inventor that quantifies resonance deviations by using a number of frequencies associated with resonance peaks for analysis. This has been found to improve the robustness of the detection process over algorithms which use a single or a small number of peaks. The algorithm determines the closeness of the measured spectrum with a reference spectrum, while accounting for the fact that each frequency region behaves differently. That is, each frequency shift is not a fixed amount, nor is the frequency shift a fixed amount for the entire spectrum, which is another reason that the traditional cross-correlation methods are not appropriate for this type of resonance peak analysis.

Figure 4:
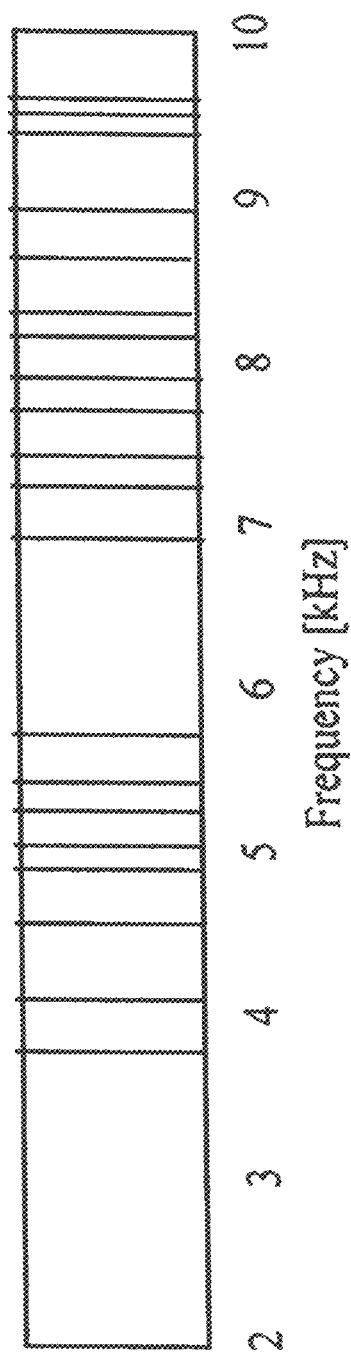
FIG. 4 shows the resonance frequency spectrum, converted to a barcode form, derived from FIG. 3B(a) for a properly seated valve.

In its most basic form, as a first step, the measured acoustic resonance spectrum from FIG. 3B(a) for a properly seated valve was converted to a spectrum of only frequencies as shown in FIG. 4. This bar-code type of presentation has no amplitude information; rather just the frequencies are presented. Small peaks count as much as larger peaks, which yields a more robust correlation than amplitude-based analysis. It is possible to create a spectrum of frequencies that also contains other information, such as the resonance Q (related to peak-width-at-half-maximum), and peak amplitude. The additional information can be coded as line width and different colors based on amplitude. To generate a useful reference template, it is desired that the spectrum is obtained for a properly seated valve multiple times by opening and closing it each time before the measurement is taken. Depending on the valve, it is possible that some of the resonance frequencies will show slight variation in peak frequency; therefore, a mean value for each resonance frequency is recorded and the reference spectrum is replaced by these mean positions for all the individual peaks. Again, the frequency variation in each independent peak can be slightly different for multiple measurements. For best discrimination, the entire spectrum is divided into small frequency bands and the peaks in each band measured. The mean may be taken when the number of peaks within that narrow frequency window (band) exceeds a chosen threshold value; therefore, isolated random peaks will not be considered. Moreover, any peaks below a chosen amplitude threshold are also discarded. Small variations are possible due to large temperature (and pressure) variation and manufacturing tolerance. The final template is therefore not corrupted by accidental inclusion of bad data from a given measurement. Individual valves are calibrated to produce their own reference spectra, rather than relying on factory calibrations. However, factory calibrations may also be acceptable in some situations.

The peak correlation equation is as follows:

$$Corr = \frac{100}{N_{ave}} \sum_{i=1}^{N_t} \sum_{j=1}^{N_u} (-\{sgn(f_t - f_u - \delta f) - sgn(f_t - f_u + \delta f)\}/2),$$

where the subscripts t and u refer to template and unknown, respectively; $N_t$ and $N_u$ are the number of frequency peaks in the template and unknown datasets, respectively; δf is the frequency window used in the correlation, and depends on the tolerances involved; $N_{ave}$ is the average number of resonance peaks in the template and the unknown datasets; and sgn is the mathematical sign function, which can take values of '+' and '−' depending on the sign of the argument within parentheses.

The above mathematical cross-correlation process provides the following information:

1. Total number of peaks that are common (within a predefined frequency spread-frequency window) to both the template and the item under investigation, such as a valve.
2. In the situation where the items under investigation include similar vessels containing unknown materials, the cross-correlation process can determine which class the unknown item fails into, by cross-correlating the unknown set of resonances with all the known templates. The template that produces the highest correlation number determines the class for the unknown item. For a completely unknown vessel (i.e., when no reference template is available for that class), the highest cross-correlation number provides information concerning the best possible match.

The correlation provides a single number with a theoretical maximum of 100 (100%). This number can only be achieved if the transducers are not moved from the time when the reference spectrum is generated. If either or both transducers are moved, the frequency positions will remain the same but the amplitudes may vary and occasionally one or more frequencies will disappear if the transducer happens to be located on a nodal position for that particular resonance. Therefore, a correlation number of larger than 95 is considered by the present inventor to be a perfect match that allows for some variability. If a correlation drops below a threshold of 95, the valve can be considered to be leaking. Indeed, this number is arbitrary and there is only statistical justification from other experiments for using it. The threshold can be set at different values for different applications where larger variations are expected. For example, if similar objects having internal differences are grouped together, where the transmitting and receiving transducers are placed on each object before measurements are taken, it is expected that the measured spectrum will have greater variability than if the transducers are fixed on a single object, such as a valve. In such situations, the threshold may be lower than 95.

Each industry has its own requirements for acceptable valve leakage, Embodiments of the present invention do not quantify valve leakage, but rather identify whether a valve is fully seated. Deviations from the full seated condition are what is needed by industry. A chosen correlation number, say, better than 95% can be considered as a fully seated condition and anything greater than can be considered an undesirable leak. Different valve sizes or configurations may have different standard deviations in repeatability, essentially represented by δf in the above equation. When the template is generated, one makes a number of measurements and finds the standard deviation and the mean. The mean is used in the mean template and the δf is the deviation. One can use 1.5 times the standard deviation, etc.

For gate valves, the quality of seating when the valve is in the closed condition is the question. Therefore, whether the leak is minor or large does not matter; the smallest leaks need to be detected, and embodiments of the present invention provide a leak detector, and not a leak meter where a reading must be calibrated accurately.

Figure 6:
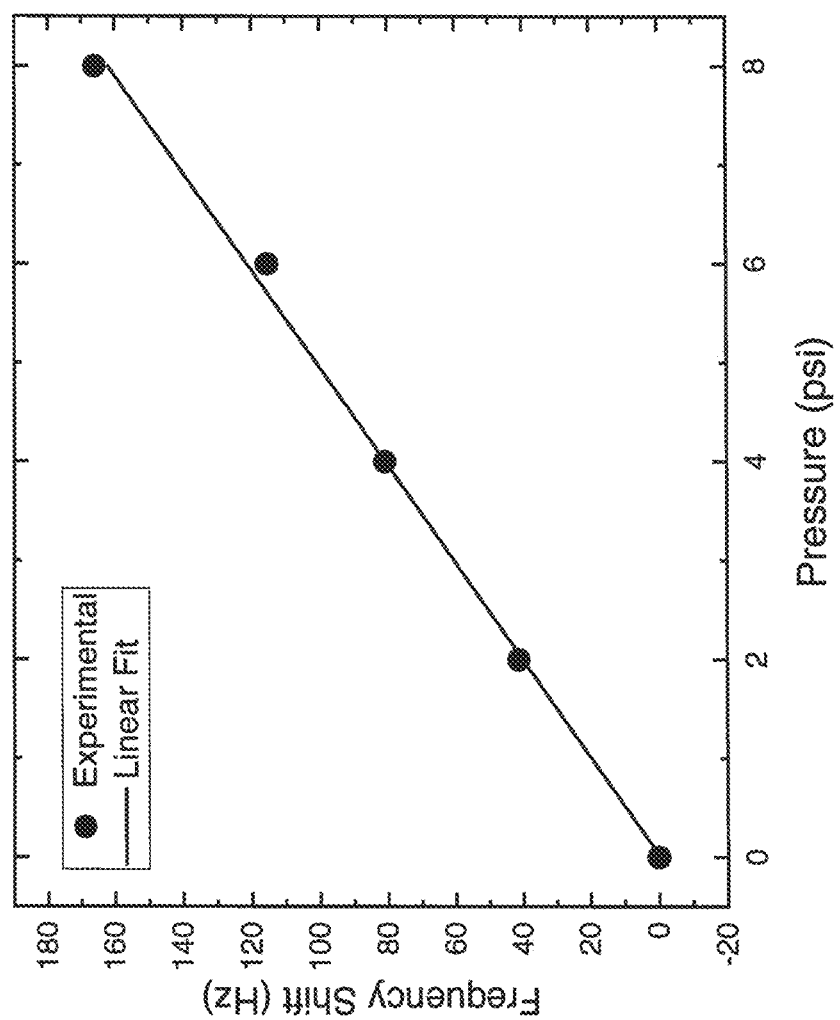
FIG. 6 shows the frequency shift of the entire spectrum as described in FIG. 5C as a function of internal pressure of a cylindrical vessel, illustrating how the pressure shifts the entire spectrum in a linear fashion for the pressure range shown.

In many circumstances, the pressure of the fluid inside a valve or other object can vary and may thereby affect the resonance spectrum of the object as measured from the outside. The effect of pressure is similar to applying tension to a vibrating string, where changes in the tension shifts the resonance frequency in a linear manner. For a 3-dimensional object, all the resonance frequencies behave in the same manner and simultaneously shift the frequency. This is illustrated in FIGS. 5 and 6, hereof. FIG. 5A is a reference spectrum with no pressure (ambient condition), and FIG. 5B is a spectrum obtained when the pressure inside the object (a steel hollow cylindrical pressure vessel) is increased. The shift of the spectrum is clearly uniform, and the amount of the shift is determined by the configuration of the object (size, shape, wall thickness, material, etc.). Although, pressure dependence can be predicted mathematically, it is simpler to calibrate a particular object, as needed. FIG. 5C shows the result obtained through pattern matching of the frequency-shifted spectrum with the reference spectrum, obtained by shifting the reference spectrum until the best match with the frequency-shifted spectrum occurs. It should be pointed out that the pattern matching is achieved using the bar-code type of spectrum where the data are represented by 1 s and 0 s, and there is no amplitude information used. There are several mathematical approaches available to do this, but FIG. 5C was derived by frequency-shifting in small steps and multiplying the two spectra until a maximum signal is obtained. The resulting peak position is thus a measure of the spectrum shift. This is a shift of all resonance peaks in the same direction with pressure. The pressure can be both positive and negative (vacuum) when compared to the reference pressure, and, in situations of determining the effect of negative pressure, the frequency shift is in the opposite direction from that of positive pressure. A pressure of about 4 Torr has been measured starting from an ambient pressure of 760 Torr.

FIG. 6 shows the experimental data on the large steel cylinder utilized in FIG. 5, where a change of pressure of a few psi shows a linear shift in frequency as obtained through the process mentioned in FIG. 5C. This permits a noninvasive pressure measurement approach for sealed or other vessels or objects. If a prior calibration is performed, the same type of object can use a calibration from a single object if a small error is acceptable.

When investigating leaking valves, if it is known that the pressure is going to significantly change, and it is expected that there will be a shift of the entire spectrum from a reference, the shifted spectrum should be used for leak detection or valve seating determinations. By combining such multiple approaches, the present method becomes a general procedure.

The foregoing description of the invention has been presented for purposes of illustration and description and is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. An apparatus for determining whether fluid is leaking through a valve seat when said valve is in a closed condition, comprising:

a valve comprising a valve seat, a disk or plug for forming a fluid seal with said seat, a stem for driving said disk or plug against said seat, and a valve body having an outside surface;

an acoustic transmitting transducer disposed in vibrational contact with the outside surface of said valve for generating vibrations in the valve body when excited by a chosen voltage signal;

an acoustic receiver disposed in vibrational contact with the outside surface of said valve for receiving vibrations induced in said valve body, and converting the received vibrations into electrical voltages;

a frequency sweep generator in electrical communication with said acoustic transmitting transducer, for generating chosen excitation voltage signals having frequencies within a selected frequency range thereon;

a narrow-band, band-pass tracking filter having a center frequency which tracks the frequencies within the selected frequency range generated by said frequency sweep generator, and having a chosen frequency bandwidth, for receiving electrical voltages from said acoustic receiver and filtering the electrical voltages; and a microcontroller for controlling said frequency sweep generator and said band-pass tracking filter, for storing the filtered electrical voltages from said band-pass tracking filter, for generating at least two acoustic resonance spectra of said valve in its closed condition, and for comparing the at least two generated acoustic resonance spectra to determine whether there is a difference therebetween.

2. The apparatus of claim 1, further comprising an amplifier for receiving the electrical voltages from said ultrasonic receiving transducer, and amplifying the electrical voltages.

3. The apparatus of claim 1, further comprising a pressure sensor for determining fluid pressure in the region of said valve seat.

4. The apparatus of claim 1, wherein said acoustic transmitting transducer and said acoustic receiver are not in physical contact with one another.

5. The apparatus of claim 1, wherein the frequency sweep from said frequency sweep generator is in either or both directions.

6. The apparatus of claim 1, wherein said acoustic transmitting transducer comprises a piezoelectric transducer and said acoustic receiver is chosen from a piezoelectric transducer and a laser Doppler vibrometer.

7. A method for determining whether fluid is leaking through a valve seat of a valve when said valve is in a closed condition, comprising:

generating vibrations having chosen frequencies in a selected frequency range in said valve comprising a valve seat, a disk or plug for forming a fluid seal with the seat, a stem for driving said disk or plug against the seat, and a valve body having an outside surface using an acoustic transmitting transducer disposed in vibrational contact with the outside surface of said valve and driven by a frequency sweep generator;

receiving resonance vibrations induced in the valve body using an acoustic receiver disposed in vibrational contact with the outside surface of said valve, and converting the received vibrations into electrical voltages;

receiving the electrical voltages and filtering the electrical voltages using a narrow-band, band-pass tracking filter having a center frequency which tracks selected excitation frequencies in the selected frequency range;

storing the filtered electrical voltages, whereby an acoustic resonance spectrum of said valve is generated;

comparing the generated acoustic resonance spectrum of said valve with at least one other acoustic resonance spectrum obtained for said valve in the closed condition thereof; and determining whether there is a difference between the generated acoustic resonance spectrum and the at least one other acoustic resonance spectrum.

8. The method of claim 7, wherein the electrical voltages from the acoustic receiver are amplified.

9. The method of claim 7, wherein the acoustic transmitting transducer and the acoustic receiver are not in physical contact with one another.

10. The method of claim 7, wherein the acoustic transmitting transducer is swept in frequency in either or both directions by the frequency sweep generator.

11. The method of claim 7, wherein the acoustic transmitting transducer comprises a piezoelectric transducer and the acoustic receiver is chosen from a piezoelectric transducer and a laser Doppler vibrometer.

12. The method of claim 7, wherein said step of comparing the generated acoustic resonance spectrum of said valve with another acoustic resonance spectrum obtained for said valve in the closed condition thereof comprises a peak position-based signature correlation.

13. The method of claim 12, wherein the peak position-based signature correlation is performed using the equation:

$$Corr = \frac{100}{N_{ave}} \sum_{i=1}^{N_t} \sum_{j=1}^{N_u} (-\{sgn(f_t - f_u - \delta f) - sgn(f_t - f_u + \delta f)\}/2),$$

where the subscripts t and u refer to template and unknown, respectively; $N_t$ and $N_u$ are the number of frequency peaks in the template and unknown datasets, respectively; $\delta f$ is the frequency window used in the correlation, and depends on the tolerances involved; $N_{ave}$ is the average number of resonance peaks in the template and the unknown datasets; and sgn is the mathematical sign function.

14. The method of claim 7, further comprising the step of determining fluid pressure in the region of the valve seat.

15. The method of claim 14, further comprising the step of pattern matching the generated acoustic resonance spectrum of said valve with at least one reference acoustic resonance spectrum obtained for said valve in the closed condition thereof for fluid pressure within said valve.

16. A method for determining whether a vessel similar or identical in appearance to other vessels is similar or identical thereto, and contains similar fluids thereto, comprising:

generating vibrations having chosen frequencies in a selected frequency range in said vessel from an acoustic transmitting transducer disposed in vibrational communication with the outside surface of said vessel, and driven by a frequency sweep generator;

receiving resonance vibrations induced in said vessel using an acoustic receiver disposed in vibrational communication with the outside surface of said vessel, and converting the received vibrations into electrical voltages;

receiving the electrical voltages and filtering the electrical voltages using a narrow-band, band-pass tracking filter having a center frequency which tracks selected excitation frequencies in the selected frequency range;

storing the filtered electrical voltages, whereby an acoustic resonance spectrum of said vessel is generated;

comparing the generated resonance spectrum of said vessel with at least one acoustic resonance spectrum obtained for another of said vessels; and determining whether there is a difference between the generated acoustic resonance spectrum and the at least one other acoustic resonance spectrum.

17. The method of claim 16, wherein the electrical voltages from the acoustic receiving transducer are amplified.

18. The method of claim 16, wherein the acoustic transmitting transducer and the acoustic receiver are not in physical contact with one another.

19. The method of claim 16, wherein the acoustic transmitting transducer is swept in frequency in either or both directions by the frequency sweep generator.

20. The method of claim 16, wherein the acoustic receiver is chosen from an acoustic piezoelectric transducer and a laser Doppler vibrometer.

21. The method of claim 16, wherein said step of comparing the generated acoustic resonance spectrum of said vessel with at least one other acoustic resonance spectrum obtained for another of said vessels, comprises a peak position based signature correlation.

22. The method of claim 16, wherein said vessel is chosen from a vaccine vial and a syringe.

23. A method for determining the tightness of sealing flanges, comprising a cover flange and a flange attached to a pipe secured by bolts and nuts or a clamp, for accessing fluids in a vessel, comprising:

generating vibrations having chosen frequencies in a selected frequency range in said sealing flanges, said nuts and bolts or said clamp, said pipe, and said vessel, using an acoustic transmitting transducer disposed in vibrational communication with an outside surface of said pipe or said vessel and driven by an acoustic frequency sweep generator;

receiving resonance vibrations induced in said sealing flanges, said nuts and bolts or said clamp, said pipe, and said vessel, combined, using an acoustic receiver disposed in vibrational contact with the outside surface of said pipe or said vessel, and converting the received vibrations into electrical voltages;

receiving the electrical voltages and filtering the electrical voltages using a narrow-band, band-pass tracking filter having a center frequency which tracks selected excitation frequencies in the selected frequency range;

storing the filtered electrical voltages, whereby an acoustic resonance spectrum of the combination of said sealing flanges, said nuts and bolts or said clamp, said pipe, and said vessel, is generated;

comparing the generated acoustic resonance spectrum that includes the frequency range of the combination of said sealing flanges, said nuts and bolts or said clamp, said pipe, and said vessel, with at least one other acoustic resonance spectrum obtained for the combination of said sealing flanges, said nuts and bolts or said clamp, said pipe, and said vessel; and determining whether there is a difference between the generated acoustic resonance spectrum and the at least one other acoustic resonance spectrum.

24. The method of claim 23, wherein the electrical voltages from the acoustic receiver are amplified.

25. The method of claim 23, wherein the acoustic transmitting transducer and the acoustic receiver are not in physical contact with one another.

26. The method of claim 23, wherein the acoustic transmitting transducer is swept in frequency in either or both directions by the frequency sweep generator.

27. The method of claim 23, wherein the acoustic transmitting transducer comprises a piezoelectric transducer and the acoustic receiver is chosen from a piezoelectric transducer and a laser Doppler vibrometer.

28. The method of claim 23, wherein said step of comparing the generated acoustic resonance spectrum of the combination of said sealing flanges, said nuts and bolts or said clamp, said pipe, and said vessel with another acoustic resonance spectrum obtained for the combination of said sealing flanges, said nuts and bolts or said clamp, said pipe, and said vessel, comprises a peak position-based signature correlation.

29. The method of claim 28, wherein the peak position-based signature correlation is performed using the equation:

$$Corr = \frac{100}{N_{ave}} \sum_{i=1}^{N_t} \sum_{j=1}^{N_u} (-\{sgn(f_t - f_u - \delta f) - sgn(f_t - f_u + \delta f)\}/2),$$

where the subscripts t and u refer to template and unknown, respectively; $N_t$ and $N_u$ are the number of frequency peaks in the template and unknown datasets, respectively; $\delta f$ is the frequency window used in the correlation, and depends on the tolerances involved; $N_{ave}$ is the average number of resonance peaks in the template and the unknown datasets; and sgn is the mathematical sign function.

30. The method of claim 23, further comprising the step of determining fluid pressure in said pipe or said vessel.

31. The method of claim 30, further comprising the step of correcting the generated acoustic resonance spectrum for the combination of said sealing flanges, said nuts and bolts or said clamp, said pipe, and said vessel, and at least one other acoustic resonance spectrum obtained for the combination of said sealing flanges, said nuts and bolts or said clamp, said pipe, and said vessel, for fluid pressure within said pipe and said vessel.

* * * * *